United States Patent [19]
Braat et al.

[11] Patent Number: 5,708,638
[45] Date of Patent: Jan. 13, 1998

[54] DEVICE FOR OPTICALLY SCANNING A RECORDING MEDIUM BY FOCUSING THE BEST FOCUS OR THE PARAXIAL FOCUS TO THE INFORMATION LAYER

[75] Inventors: Josephus J. M. Braat; Igolt P. D. Ubbens; James H. Coombs; Jacob Sonneveld; Jacobus P. C. Kroon; Petrus T. Jutte, all of Eindhoven, Netherlands

[73] Assignee: U.S. Philips Corporation, New York, N.Y.

[21] Appl. No.: 615,931

[22] Filed: Mar. 14, 1996

[30] Foreign Application Priority Data

Mar. 15, 1995 [EP] European Pat. Off. ............. 95200619

[51] Int. Cl.⁶ .................................................. G11B 7/00
[52] U.S. Cl. .................................... 369/112; 369/58
[58] Field of Search .................... 369/44.14, 44.23, 369/44.24, 44.27, 44.32, 44.37, 103, 109, 110, 112, 54, 58

[56] References Cited

U.S. PATENT DOCUMENTS

| | | | |
|---|---|---|---|
| 4,023,033 | 5/1977 | Bricot et al. | 250/201 |
| 4,724,533 | 2/1988 | Ohara et al. | 369/45 |
| 5,446,565 | 8/1995 | Komma et al. | 369/103 X |

FOREIGN PATENT DOCUMENTS

| | | | |
|---|---|---|---|
| 0583036A2 | 2/1994 | European Pat. Off. | G11B 7/13 |
| 0610055A2 | 8/1994 | European Pat. Off. | G11B 7/135 |
| 07057271 | 3/1995 | Japan . | |

*Primary Examiner*—David C. Nelms
*Assistant Examiner*—P. W. Huber
*Attorney, Agent, or Firm*—Michael E. Belk

[57] ABSTRACT

An optical scanning device can scan two types of record carriers each having a transparent layer with a different thickness, in which a radiation beam scans an information layer of the record carrier through the transparent layer. When scanning a first type of record carrier the best focus of a scanning radiation beam is positioned on the information layer and when scanning a second type of record carrier the paraxial focus of the radiation beam is positioned on the information layer.

21 Claims, 8 Drawing Sheets

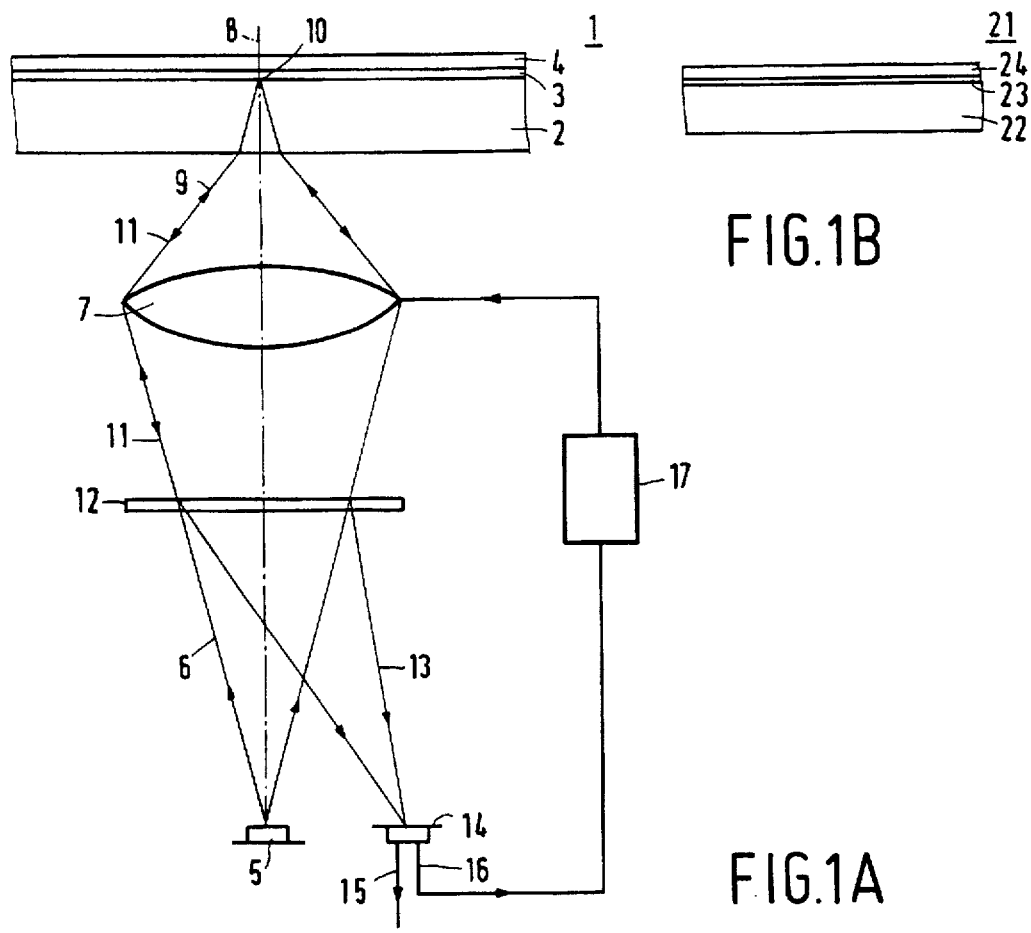
FIG.1B
FIG.1A
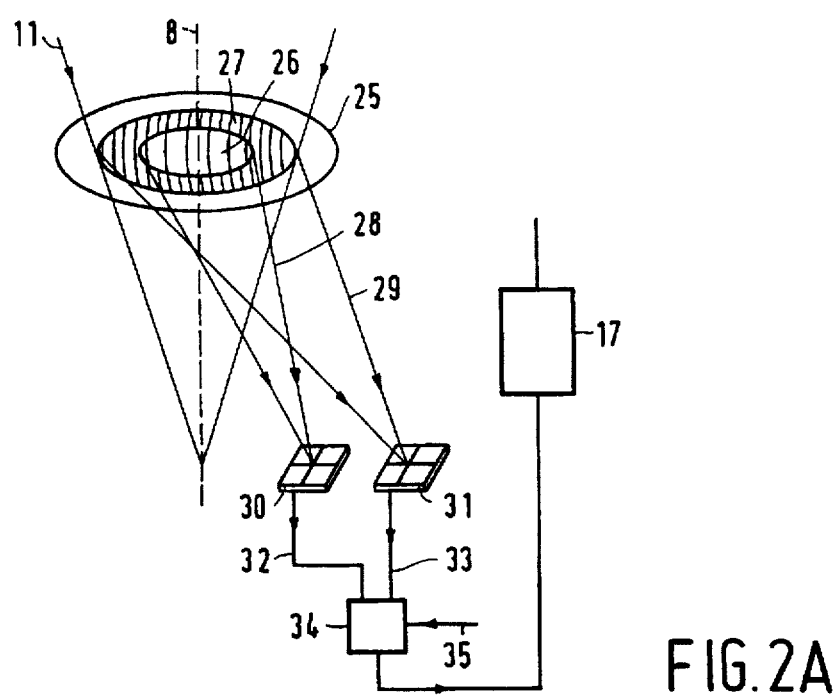
FIG.2A

DEVICE FOR OPTICALLY SCANNING A RECORDING MEDIUM BY FOCUSING THE BEST FOCUS OR THE PARAXIAL FOCUS TO THE INFORMATION LAYER

BACKGROUND OF THE INVENTION

The invention relates to a device for optically scanning a first type of record carrier having a first information plane and a first transparent layer of a first thickness or a second type of record carrier having a second information plane and a second transparent layer of a second thickness different from the first thickness, comprising a radiation source for generating a radiation beam and an objective lens designed for converging the radiation beam through the first transparent layer to a focus on the first information layer. The invention also relates to a method for optically scanning a record carrier of the first or second type. The scanning includes writing, reading and/or erasing information in the record carrier.

The transparent layer in optical record carders has, in general, the function of protecting the information layer and providing mechanical support for the record carrier, i.e. it acts as a substrate for the information layer. The thickness of the transparent layer is a compromise between the desired stiffness of the record carrier and the numerical aperture of the radiation beam used for scanning the information layer. If for a new type of record carrier the numerical aperture is increased in order to increase the storage density of the information layer, it is often necessary to reduce the thickness of the transparent layer in order to reduce the influence of disc tilt on the quality of the radiation beam. As a consequence, there will be different types of record carrier on the market, having different thicknesses of the transparent layer. A compatible record player should be able to scan all types of record carrier, irrespective of the thickness of the transparent layer.

The transparent layer, through which a radiation beam scans the information layer, introduces a so-called spherical aberration in the radiation beam. The spherical aberration is compensated in the objective lens, making the radiation beam near its focus substantially free from spherical aberration. If an objective lens compensated for a first thickness of the transparent layer is used for scanning a record carrier with a transparent layer of a second, different thickness, the focus will be deteriorated due to the under- or over-compensated spherical aberration.

A device for scanning optical record carriers having transparent layers of different thicknesses is disclosed from the European patent application EP 0 610 055. This known device uses a bifocal objective system for forming a converging radiation beam with two vergences, one vergence for each focus. The objective system comprises an objective lens and a transmission hologram arranged in the optical path between the radiation source and the objective lens. The collimated zero-order beam transmitted by the hologram is converged by the objective lens to a first focus, which is compensated for spherical aberration due to a thin transparent layer. The hologram diffracts part of the incoming collimated radiation beam in a diverging first-order beam. The first-order beam is also converged by the objective lens to a second focus, but the combination of the hologram and the objective lens is now compensated for a thick transparent layer. When scanning a record carrier, the device selects the first or second focus which are axially separated, in dependence on the type of record carrier. A disadvantage of this known device is that it requires two components, i.e. an objective lens and a hologram, which must both be carefully aligned. Another disadvantage is that the hologram distributes the optical power of the radiation source over two beams, the zero-order beam and first-order beam. It is therefore difficult to obtain sufficient intensity in the first or second focus to use it for writing or erasing information in a record carrier. Moreover, the distribution of optical power results in an uneven intensity distribution in the transmitted zero-order beam, leading to an increased jitter in the read signal from the first information layer.

SUMMARY OF THE INVENTION

It is an object of the invention to provide a device for optically scanning a record carrier, which has a simple construction and an improved utilisation of the optical power emitted by the radiation source. A further object of the invention is to provide a method for scanning different types of optical record carriers without the above-mentioned disadvantages.

The first object is met by a device as described in the opening paragraph, which device is characterized according to the invention in that it comprises means for positioning the best focus of the radiation beam substantially on the first information layer and the paraxial focus of the radiation beam substantially on the second information layer.

The objective lens in the device according to the invention is designed for converging the radiation beam with a single vergence through the first transparent layer to a best focus on the first information layer. A lens has, in general, three focal points: the paraxial focus, the best focus, and the marginal focus. In the absence of aberrations, these three focal points coincide. The best focus is the axial position where the intensity of the converging beam reaches its maximum value. When the best focus should be positioned on the second information layer, the second transparent layer will introduce spherical aberration which gives a low quality of the focal spot. The invention resides in the insight that the second information layer may be properly scanned by the aberrated converging beam, if, instead of the best focus, the paraxial focus of the converging beam is positioned substantially on the second information layer. The paraxial focus is the axial position where the intensity of the converging beam reaches a sub-optimum value, and where rays close to the optical axis of the beam come to a proper focus. The optimum position of the second information plane is in general near the paraxial focus, up to a few focal depths removed from it because of residual spherical aberration in the central part of the beam. It turns out that at this position the spherical aberration has a strongly reduced influence on the quality of the focal spot, which allows a proper scanning of the second information layer in spite of the different thickness of the second transparent layer. The thickness of the second transparent layer may be larger or smaller than the thickness of the first transparent layer.

A suitable embodiment of the device according to the invention is characterized in that the means for positioning comprise a first focus error detection system having a first radiation-sensitive detector for determining a focus error of the best focus out of radiation in at least an annular outer area of the cross-section of a reflected beam of radiation coming from the scanned record carrier, a second focus error detection system having a second radiation-sensitive detector for determining a focus error of the paraxial focus out of radiation in a central area of the cross-section of said reflected beam, and a focus servo system for positioning the objective lens in response to a focus error signal representing one of said focus errors. A focus error is the axial distance between the focus and the information layer. The optical axis of the reflected beam passes substantially through the centre of the central area. The annular outer area touches the central area and is concentric with it. A proper selection of the rays in the reflected beam which are used for generating a focus error enables the device to derive a focus error for both the best focus and the paraxial focus. The first radiation-sensitive detector may also use radiation form the entire cross-section of the reflected beam for deriving the best focus error.

In a special embodiment of the device the selection is made by dividing the reflected beam into two beams, one beam formed out of at least the annular outer area of the reflected beam, the other one out of the central area of the reflected beam. In another special embodiment the selection is made by dividing the detector intercepting the reflected beam into two sub-detectors, one sub-detector capturing rays from at least the annular outer area of the cross-section of the reflected beam, the other sub-detector capturing rays from the central area of the cross-section.

The spot formed by the reflected beam on the detector when scanning the second information plane may be regarded as composed of two spots, a first spot formed by radiation from the central area of cross-section of the reflected beam and a second spot formed by radiation from the annular outer area. The first spot is relatively restricted in size, whereas the second spot is substantially larger due to the spherical aberration. If the size of the detector is now chosen to be about equal to or larger than the size of the first spot and substantially smaller than the size of the second spot, then the detector will mainly intercept rays from the central area, and the strongly aberrated rays from the annular outer area will hardly influence the output signal of the detector. Since the spot on the detector while scanning the first information plane is in general smaller than said first spot; the detector will then intercept radiation from the entire cross-section of the reflected beam. Hence, a device comprising such a detector in a focus error detection system will automatically position the best focus on the information layer when scanning a record carrier of the first type and the paraxial focus on the information layer when scanning a record carrier of the second type.

The quality of the information signal representing the dam read from a record carrier is affected by the spherical aberration present in the beam incident on the information layer when scanning a record carrier of the second type. The influence of the spherical aberration can be reduced by employing a small information detector that captures only a central part of the reflected beam. When scanning a record carrier of the first type, an information detector should be used that captures radiation from at least the annular outer area of the cross-section of the reflected beam. The arrangement of the information detectors and possible division of the reflected beam may be comparable to the afore described three embodiments of the focus detectors.

The trend of increasing storage density leads to thinner substrates, as set out above. Since new record carriers with such thin substrates have tighter tolerances on the optical path, the optical path of a compatible device for scanning such a record carrier and a record carrier having a thicker substrate is preferably designed for scanning the record carrier having the thin substrate with the best focus. The more tolerant record carrier having the thick substrate is then scanned with the paraxial focus of lower quality.

The device according to the invention is preferably designed for scanning a first information layer having a high information density by the best focus and a second information layer having a low information density by the paraxial focus. If information stored in the form of pits in the second information layer is read by the best focus, the resulting information signal will have a reduced quality, because the spot size of the best focus is too small to read the relatively large pits. However, the spot size of the paraxial focus is slightly larger than that of the best focus because of the residual spherical aberration. Hence, the paraxial focus is more appropriate to read the relatively large pits.

The second object of the invention is met by providing a method for optically scanning a first type of record carrier having a first information plane and a first transparent layer of a first thickness or a second type of record carrier having a second information plane and a second transparent layer of a second thickness different from the first thickness, comprising the step of converging a radiation beam by means of an objective lens through the first transparent layer to a best focus substantially on the first information layer when scanning a record carrier of the first type, and the step of converging the radiation beam by means of the objective lens through the second transparent layer to a paraxial focus substantially on the second information layer when scanning a record carrier of the second type.

BRIEF DESCRIPTION OF THE DRAWINGS

The invention will now be described by way of example and with reference to the accompanying drawings, in which FIG. 1A shows a device according to the invention scanning a record carrier of the first type;

FIG. 1B shows a record carrier of the second type;

FIG. 2A shows a beam-dividing element and detection system for the astigmatic method;

DESCRIPTION OF THE PREFERRED EMBODIMENTS

Figure 1C:
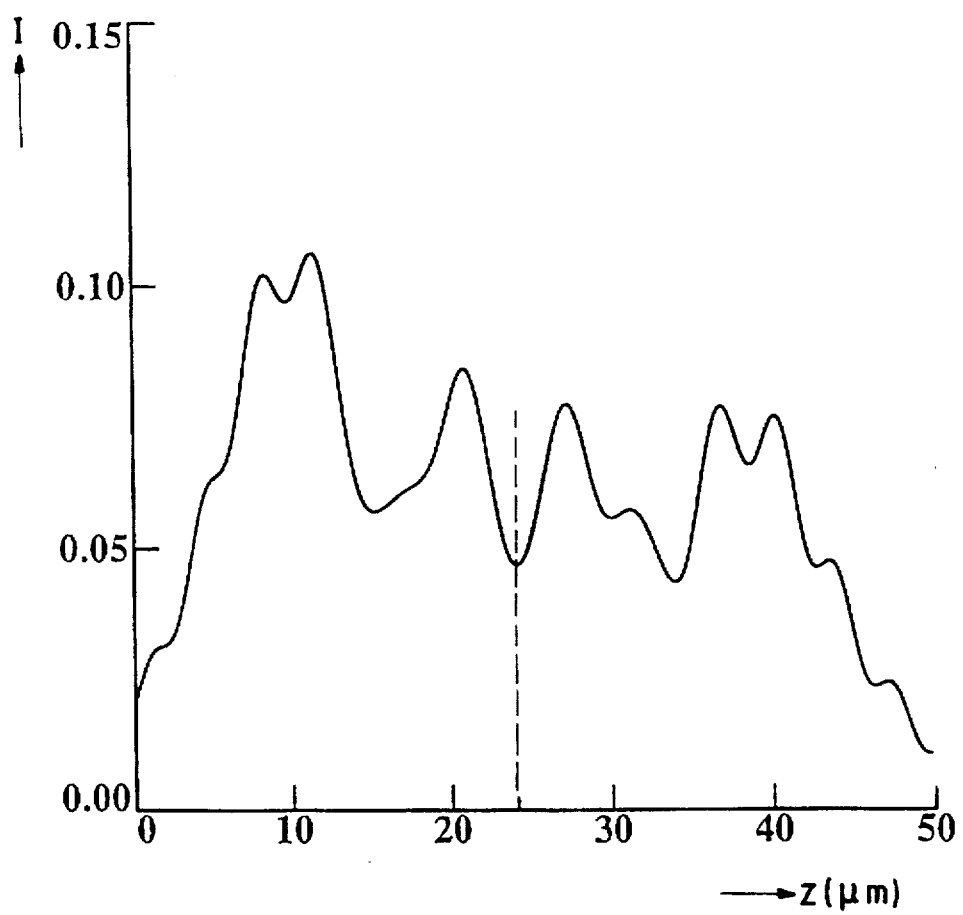
FIG. 1C shows the radiation intensity along the optical axis when scanning a record carrier of the second type.

FIG. 1A shows a device for scanning an optical record carrier 1. The record carrier comprises a transparent layer 2, on one side of which an information layer 3 is arranged. The side of the information layer facing away from the transparent layer is protected from environmental influences by a protection layer 4. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4. Information can be stored in the record carrier in the form of optically detectable marks arranged in substantially parallel tracks, not indicated in the Figure. The marks may be in the form of pits, areas with a reflection coefficient or a direction of magnetization different from its surroundings, or a combination of these forms.

The scanning device comprises a radiation source 5, for instance a semiconductor laser, emitting a diverging radiation beam 6. A single-focus objective lens 7 having an optical axis 8 transforms the radiation beam 6 to a converging beam 9 which forms a focal spot 10 on the information layer 3. Although the objective lens is indicated in the Figure as a single lens element, it may also comprise a combination of a collimator lens and an objective lens, a hologram operating in transmission or reflection, or a grating for coupling radiation out of a waveguide carrying the radiation beam. Radiation of the converging beam 9 reflected by the information layer 3, forming a reflected beam 11, returns on the optical path of the forward converging beam 9. After the objective lens 7 a beam splitter 12, for instance a diffraction grating, splits a part of the reflected beam 11 out of the optical path of the forward beam and forms a detection beam 13. Radiation of the detection beam is captured by a detection system 14, which converts the optical power in electrical signals. One of these signals is an information signal 15 the value of which represents the information read from the information layer 3. Another signal is a focus error signal 16, the value of which represents the axial difference in height between the focal spot 10 and the information layer 3. The focus error signal is used as input for a focus servo controller 17, which controls the axial position of the objective lens 7, thereby controlling the axial position of the focal spot 10. The part of the detection system used for generating the focus error is called the focus error detection system. The focus servo system for positioning the objective lens comprises the focus error detection system, the focus servo controller and an actuator for moving the objective lens.

The objective lens 7 has been designed to form an optimum focus on the information layer 3, i.e. a focus with a Strehl ratio approaching 1. For this reason the objective lens 7 has been corrected for the spherical aberration incurred by the converging beam when passing the transparent layer 2 of the record carrier 1. The wavefront of the converging beam close to the focal spot 10 is substantially spherical. FIG. 1B shows a record carrier 21 of another type having an information layer 23 and a transparent layer 22 of a thickness different from the thickness of the transparent layer 2. When the same device is used for scanning this record carrier, the objective lens 7 will not be corrected properly for the transparent layer 22. The focus servo controller 17 will adjust the position of the objective lens 7 such that the average deviation of the wavefront of the beam near the information layer 23 from a spherical shape has a minimum value over the cross-section of the beam. The remaining spherical aberration at the position of the information layer results in a wavefront strongly undulating over the entire aperture, which causes the focal spot to be strongly aberrated. Such a focal spot is less suitable for scanning the record carrier 21.

The invention resides in the insight that the information layer 23 may be scanned properly by means of the converging beam 9 when the information layer is arranged axially not at the position of the best focus but near the position of the paraxial focus. In a small range around the position of the paraxial focus the wavefront of the aberrated converging beam is substantially spherical in a central part of the aperture. The focal spot comprises a small, central region of high intensity resulting from rays in the central part of the aperture, and a large region of low intensity surrounding the small region and resulting from rays outside the central part. The quality of the central region of the focal spot is then sufficient for properly scanning the information layer 23, while the outer region can be made not to affect the scanning.

FIG. 1C shows the radiation intensity along the optical axis of the objective lens 7 when scanning a record carrier of the second type for the case that the record carrier of the second type has a substrate which is 0.6 mm thicker than the substrate of the record carrier of the first type. The vertical axis shows the normalized radiation intensity I of the converging beam 9 and the horizontal axis shows the distance z from the paraxial focus away from the objective lens, measured in micrometers. The best focus, i.e. the point along the optical axis which a scanning device would normally position on the information layer 23, is located 24 µm away from the paraxial focus, as indicated in the Figure by a vertical, dashed line. Each maximum of the curve in the Figure corresponds to a location where the radiation of the converging beam is concentrated in a small region near the optical axis. At most locations along the horizontal axis the intensity distribution of the spot in a plane perpendicular to the optical axis shows rings having a relatively strong intensity around the optical axis or a high, relatively flat background intensity, both of which disturb the scanning of the information layer. In a small region around z equal to 6 µm the rings have moved to a large radius from the optical axis and the background level is strongly reduced. When, according to the invention, the information layer 23 is arranged at this position along the optical axis, the layer can be scanned properly. It is to be noted that this preferred position does not correspond to a maximum in the intensity along the optical axis. In case the substrate of the second type of record carrier is thinner than the substrate of the first type of record carrier, the intensity along the optical axis follows a curve similar to the one shown in FIG. 1C, but with the best focus position closer to the objective lens than the paraxial focus position.

Thus the preferred position of the information layer 23 should be a few focal depths of the converging beam 9 away from the paraxial focus and towards the best focus in order to minimize the wavefront deviation due to residual spherical aberration in the central part of the aperture. The number of focal depths for the thickness difference of 0.6 mm for the two types of record cartier is about four. When the information layer 23 is positioned at an axial location away from said preferred position, the quality of the focal spot reduces rapidly, leading to a reduced quality of the signals generated in the detection system 14. Any reference to the position of the paraxial focus herein below is supposed to be a reference to the preferred position.

The flattening of the central part of the wavefront when scanning the information layer 23 of record carrier 21 is accompanied by an increase in the deviation of the outer part of the wavefront. Therefore, the marginal rays in the outer part of the aperture come to a so-called marginal focus which is relatively far removed from the paraxial focus. The best focus of the aberrated beam is in between the paraxial and the marginal focus. The relatively large distance between the paraxial and marginal focus makes it possible to intercept the marginal rays before detection, thereby removing a major part of the disturbing influence of the uncompensated spherical aberration from the signals generated by the detection system. It is to be noted that the paraxial, best and marginal focus coincide when scanning record carrier 1.

Most known focus error detection systems position the best focus on the information layer. Therefore, in the device according to the invention measures are preferably taken to ensure that the best focus is positioned at the information layer 3 of record carrier 1 and the paraxial focus is positioned at the information layer 23 of record carrier 21. These measures can be divided in four classes. In the first and second class separate focus error detectors are provided for capturing rays from the central and outer part of the reflected beam, using two beams and two detectors in the first class and one beam and two detectors in the second class. In the third class a single beam and focus error detector are used, removing aberrated rays in the near field. In the fourth class again a single beam and focus error detector are used, but the aberrated rays are removed in the far field. It turns out that removal of the aberrated rays in the near field and the far field have substantially the same effect on the performance of the device.

FIG. 2A shows a beam splitter and detectors of the first class, using a far-field selection of rays in the central and outer part of the reflected beam. The beam splitter 25 combines the functions of coupling part of the reflected beam out of the path of the radiation beam 6 and of dividing radiation of the reflected beam into two detection beams. The beam splitter comprises a central area 26 and an annular outer area 27. A grating in the central area and a grating in the annular outer area each form a first and second detection beam 28, 29 respectively, out of the reflected beam 11. The curved lines of the gratings introduce a predetermined amount of astigmatism in the detection beams. The beam splitter may also be a refractive instead of diffractive element, e.g. an axicon-like structure forming the two detection beams. Each detection beam 28, 29 converges on a radiation-sensitive quadrant detector of detection systems 30 and 31, respectively. The four output signals of each of the quadrants of a detection system are used to generate a focus error signal by means of the so-called astigmatic method, known from U.S. Pat. No. 4,023,033. The method involves addition of the signals from diagonally positioned quadrants and subtraction of the resulting two sum signals. The signals of the detection systems 30 and 31 are combined to a focus error signal in a combining circuit 34.

When the record carrier 21 of the second type is scanned, a focus error signal 32 from detection system 30 is used as input for the focus servo controller 17, thereby deriving the focus error from that part of the reflected beam 11 which falls within the central area 26. The servo controller will keep the best focus of the Central part of the converging beam 9, corresponding to the central part of the reflected beam, on the information layer 23 of the record carrier. The best focus of the central part of the converging beam roughly corresponds to the paraxial focus of the converging beam 9. Thus, the output signal 32 of the detection system 30 is the paraxial focus error signal. The servo controller 17 keeps the paraxial focus of the converging beam on the information layer 23, as required for proper scanning of a record carrier of the second type.

When the record carrier 1 of the first type is scanned, the focus error should be derived from radiation of the annular outer area or substantially the entire cross-section of the reflected beam in order to position the best focus of the converging beam 9 on the information layer 3. Since the detection system 31 receives radiation from the outer part of the reflected beam, the signal of detection system 31 provides the best focus error signal. Alternatively, the signals of both detection systems can be combined to obtain the best focus error signal.

Figure 2B:
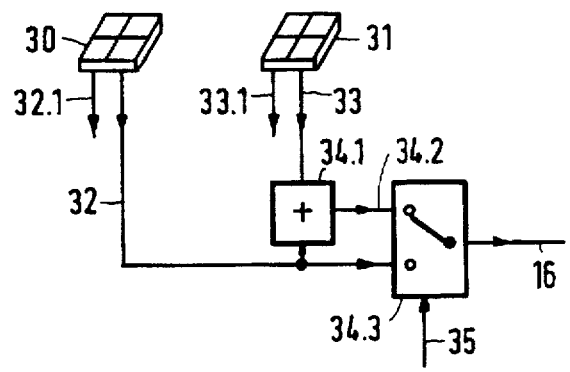
FIG. 2B shows a circuit for deriving a focus error signal.

FIG. 2B shows a circuit to combine the two focus error signals. Detection system 30 generates the paraxial focus error signal 32 and further signals 32.1 used for forming amongst others an information signal and a radial tracking error signal. Detection system 31 generates a focus error signal 33 derived from the marginal rays of the reflected beam 11 and further signals 33.1 which may be combined with the signals 32.1 to form amongst others an information signal and a radial tacking error signal. The combining circuit 34 comprises an addition circuit 34.1, adding focus error signals 32 and 33 to form a best focus error signal 34.2, derived from radiation in the entire cross-section of the reflected beam 11. The combining circuit 34 also comprises a selector 34.3 to select in response to a type signal 35 which one of the focus error signals is provided at the output of the selector and is input to the focus error controller 17. When the type signal indicates that the record carrier being scanned is of the first type, the best focus error signal will be input to the controller, and when the signal indicates that the record carrier to be scanned is of the second type, the paraxial focus error signal will be input to the controller. Elements 30, 31 and 34 together form a first focus error detection system for forming the best focus error signal 34.2, whereas element 30 forms a second focus error detection system for forming the paraxial focus error signal 32. The means for positioning the best focus or the paraxial focus on an information layer do not only comprise the focus error detection systems, an actuator for moving the objective lens and the associated servo system, but may also comprise electronic focus offset adjustment means or an actuator moving the radiation source instead of or together with the objective lens.

The addition circuit 34.1 may be omitted from the combining circuit 34. The selector 34.3 then selects between the focus error signals 32 and 33, i.e. between the paraxial focus error signal derived from the central part of the reflected beam 11 and the best focus error signal derived from the annular outer area of the reflected beam 11.

The focus error signal 34.1 can also be derived by adding the output signals of the corresponding quadrants of the two detection systems 30 and 31 and use the four sum signals to derive the focus error as if the four signals were coming from the quadrants of a single detection system.

The type signal 35 used as input for the selector 34.3 may be obtained in several ways. The signal is preferably derived from signals read from the record carrier so that the selection is made automatically. The record carrier may comprise a code that can be read irrespective of which focus is positioned at the information layer. The device uses the information in the code to set the type signal at the appropriate value. The type signal may also be derived from an assessment of the magnitude of the information signal. The device compares then the magnitude for both focus positions, and sets the type signal at the value belonging to the focus position which gives the largest magnitude. The use of the circuit for forming the type signal is not limited to the scanning device according to the invention, but extends to any scanning device for scanning two types of record carrier with different thicknesses of transparent layers.

The grating in the annular outer area 27 of the beam splitter 25 may extend over the central area 26, so that the central area comprises two intermixed gratings. The second detection beam 29 then comprises radiation from the entire cross-section of the reflected beam 11. The output signal of the focus error detection system 31 is then the best focus error signal, and the selector 34 selects between the focus error signals 32 and 33.

Figure 3:
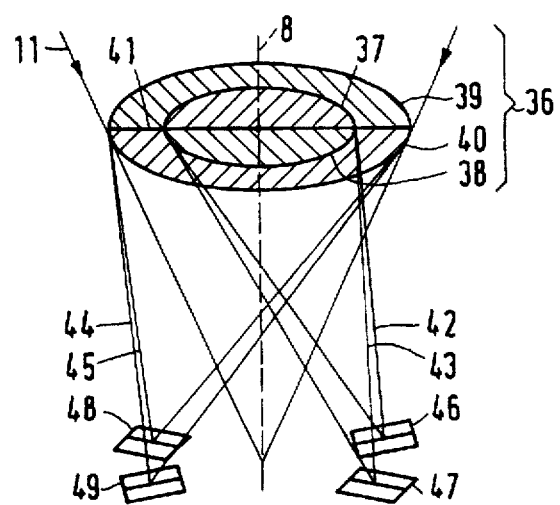
FIG. 3 shows a beam-dividing element and detection system for the Foucault method.

FIG. 3 shows another embodiment of the beam splitter and detectors of the first class. The beam splitter 36 comprises a first grating in the central area divided in two sub-gratings 37 and 38, and a second grating in the annular outer area divided in sub-gratings 39 and 40, each pair of sub-gratings lying symmetrically with respect to a dividing line 41. The first grating forms a first detection beam by diffracting radiation out of the reflected beam 11, which detection beam is incident on a first detection system. The grating lines of the sub-gratings 37 and 38 are oriented such that the first detection beam is split in two beams 42, 43, each beam converging on the dividing line of a radiation-sensitive split detector 46, 47 respectively, the two detectors making up the first detection system. Likewise, the second grating forms a second detection beam split up in two beams 44, 45, which converge on a second detection system comprising two radiation-sensitive split detectors 48, 49 having division lines. Each detection system generates a focus error signal according to the single or double Foucault method, as is known from inter alia the European patent application no. 0 583 036. The detection system forms the focus error signal by adding the output signals of the outer halves, adding the output signals of the inner halves of the split detectors and taking the difference of the two sum values.

The first detection system 46, 47 in FIG. 3 intercepts radiation from a central part of the reflected beam, thereby generating a paraxial focus error signal. The second detection system 48, 49 intercepts radiation from an annular outer area of the reflected beam. The output signal of the second detection system or a combination of the output signals of the first and second detection systems forms a best focus error signal. The selection between the output signals may be made by a circuit comparable to the one shown in FIG. 2B. The second grating 39, 40 in the outer area may extend over the central area, making the output signal of the second detection system the best focus error signal.

Figure 4:
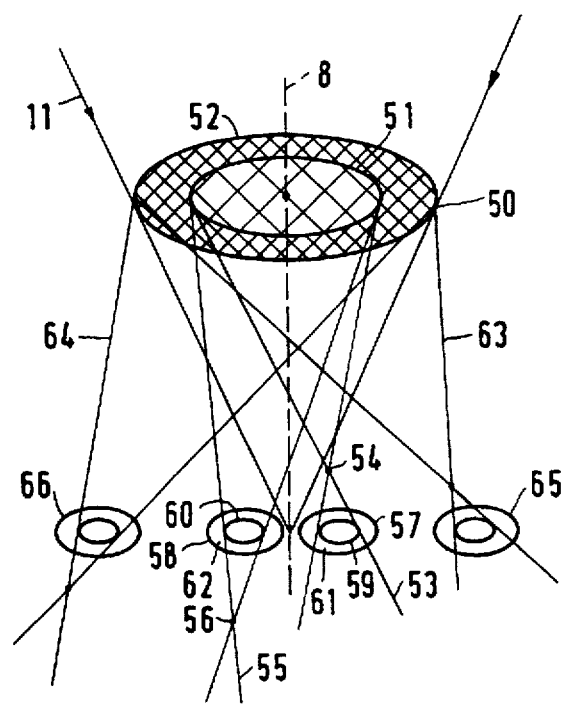
FIG. 4 shows a beam-dividing element and detection system for the beam-size method.

FIG. 4 shows another embodiment of the beam splitter and detectors of the first class. The beam splitter 50 comprises a central area 51 and an outer area 52. A first grating in the central area comprises two intermixed sub-gratings, one forming a beam 53 out of the central part of the reflected beam 11 and focused at a point 54 above a plane comprising detectors, the other forming a beam 55 focused at a point 56 below said plane. Radiation of beams 53 and 55 is intercepted by radiation-sensitive detectors 57 and 58 respectively. Each detector comprises a circular central sub-detector 59, 60 and an outer sub-detector 61, 62. The first focus error detection system formed by the two detectors 57 and 58 generates a paraxial focus error signal according to the beam-size method, known from the U.S. Pat. No. 4 724 533. The detection system adds the output signals of sub-detectors 59 and 62 and the output signals of sub-detectors 61 and 60, and subtracts the two sum signals. Each detector may have the form of three adjacent, parallel strip detectors, its dividing lines directed towards the converging point of the reflected beam, and the output signals of the two outer detectors being added. Such a configuration provides a reduced sensitivity to changes in the wavelength of the radiation.

Likewise, a second grating in the outer area 52 comprises two intermixed sub-gratings, forming beams 63 and 64 with a focal point above and below the detector plane respectively. A second focus error detection system comprising two radiation-sensitive detectors 65, 66 each having a central and outer sub-detector generates a focus error signal, which, possibly combined with the paraxial focus error signal, forms a best focus error signal. Instead of combining the focus error signals, the output signals of the sub-detectors may first be combined and then used to form the best focus error signal. The selection between the focus error signals may be made by a circuit comparable to the one shown in FIG. 2B. The second grating in the outer area may extend over the central area, making the output signal of the second detection system the best focus error signal.

Although FIGS. 3 and 4 show the pairs of detectors in a position diametrical with respect to the optical axis 8, the two pairs may be located close together by giving the grating lines another orientation, in order to facilitate the integration of the detectors on a single substrate. The minimum distance between the detectors is determined by stray-light due to the marginal rays in the reflected beam when a record cartier of the second type is scanned. The intensity of the stray-light is determined by the numerical aperture of the objective lens 7 and the difference in thickness of the transparent layers 2 and 22 of the record carrier. The stray-light should be kept away from the first detection system 46, 47; 57, 58 to avoid that the focus error signal generated by the first detection system is affected by the stray-light. The dividing line 41 in FIG. 3 may form an angle between 15° and 80° with the effective direction of the tracks on the information layer in order to reduce crosstalk between the radial error signal and the focus error signal, as described in the European patent application no. EP 0 583 036.

The size of the central area must be chosen such that the information layer of a record carrier of the second type is scanned properly. When the size is made too large, the spherical aberration will affect the quality of the paraxial focus too much. When the size is made too small, the small numerical aperture of the beam in the central area will result in an apparently large paraxial focal spot, making the reading of small details difficult. A compromise may be found by using the following approximate formula for the modulation transfer function (MTF) at the information layer for the paraxial focus:

$$MTF(v) = \frac{2}{\pi} \left[ \arccos\left(\frac{v}{v_c}\right) - \frac{v}{v_c} \sqrt{1 - \left(\frac{v}{v_c}\right)^2} \right] \left[ 1 + 2\left(v - \frac{v_c}{2}\right)^2 \left(\frac{2}{v_c}\right)^2 \cdot \epsilon - 2\epsilon \right] \quad (1)$$

with
$v = 1/p$,
$v_c = 2NA_c/\lambda$, $\epsilon = 4\pi^2 W_{40}^2/180$, $$W_{40} = \left( \frac{n^2-1}{8n^3} \right) \frac{\Delta d}{\lambda} NA_c^4$$

and with $v$ the spatial frequency, p the period of the minimum details in the information layer 23 which should be legible, $v$ the spatial cut-off frequency, $NA_c$ the numerical aperture of the radiation beam incident on the record carrier and passing through the central area of the beam and $\lambda$ the wavelength of the radiation beam. $W_{40}$ is the spherical aberration in Seidel terms in units of $\lambda$ at the information layer 23 and at the edge of said radiation beam, n is the refractive index of the transparent layer 22 and $\Delta d$ the absolute value of the thickness difference between transparent layers 22 and 2. The left-hand term in square brackets in formula (1) is the MTF of an ideal imaging system, the right-hand term in square brackets is a multiplicative factor taking into account the effect of the spherical aberration in the radiation beam.

The optimum value of $NA_c$ for scanning a record carrier of the second type can be derived from formula (1) by inserting the values for $\lambda$, p, n, $\Delta d$ and finding the value of $NA_c$ which gives the highest value of MTF(v), for instance by taking the derivative with respect to $NA_c$ of formula (1). The size of the central area is now equal to the size of the entire cross-section of the reflected beam times said value of $NA_c$ over the numerical aperture of the entire reflected beam. As an example, a device is designed to scan a record carrier of the first type having a transparent layer thickness of 0.6 mm with a radiation beam of wavelength $\lambda$=635 nm and $NA_0$=0.60. $NA_0$ being the numerical aperture of the entire radiation beam. The device should also be able to scan a record carrier of the second type having a transparent layer thickness of 1.2 mm ($\Delta d$=0.6 mm), refractive index of 1.58 and smallest details in the form of a track pitch having p=1.6 µm. The optimum value of $NA_c$ is 0.33 and the diameter of the central area is equal to the diameter of the entire cross-section of the reflected beam times 0.55 (=0.33/0.60). The tolerance on the value of $NA_c$ and the size of the central area is relatively large because of the counteracting effects of spherical aberration which increases the spot size with increasing aperture and diffraction which decreases the spot size with increasing numerical aperture. For low performance devices the tolerance is ±1:40%, for medium performance devices the tolerance is ±20% and for high-performance devices the tolerance is preferably ±10%.

The quality of the scanning spot on the information layer 23 is sufficient for values of $W_{40}$ within the central area up to one wavelength. From the expression for $W_{40}$ in equation (1), one can derive that the numerical aperture $NA_c$ of the converging beam 9 passing through the central area is preferably smaller than or equal to $$NA_c(\text{max}) = \sqrt[4]{\frac{8\lambda n^3}{\Delta d(n^2-1)}} \quad (2a)$$

The diameter of the central area in a cross-section of the reflected beam is preferably smaller than or equal to $NA_c$(max)/$NA_0$ times the diameter of the entire reflected beam in the plane of the cross-section. $NA_0$ is the numerical aperture of the entire converging beam 9. Using the parameter values of the example in the previous paragraph, this amounts to a maximum value of $NA_c$ equal to 0.39. The corresponding smallest tangential dimension of bits $d_b$ on the information layer which can still be read properly is equal to about $\lambda/(4NA_c)$, i.e. 0.42 µm bit length for 650 nm wavelength and $NA_c$ equal to 0.39. The preferred value of $NA_c$, i.e. $NA_c$ (opt), is obtained when $W_{40}$ is about equal to $\lambda/2$, or $$NA_c(\text{opt}) = \sqrt[4]{\frac{4\lambda n^3}{\Delta d(n^2-1)}} \quad (2b)$$

When n is equal to 1.58 and $\Delta d$ to 0.6 mm and $\lambda$ to 650 nm, the optimum numerical aperture of the central area is 0.33. The value of $NA_c$ is preferably larger than $\lambda/(4d_b)$ in order to be able to read details on the information layer having a tangential dimension of $d_b$ and larger. When the smallest tangential bit dimension is 0.6 µm and $\lambda$ is equal to 650 nm, then $NA_c$ is preferably larger than 0.27.

The preferred position of the information layer along the optical axis in FIG. 1C can also be expressed in terms of the parameters of equation (1). The optimum position can be found by setting the defocusing aberration $W_{20}$ equal to $-W_{40}$. The resulting defocusing z away from the paraxial focus is then $$z = \frac{n^2-1}{4n^3} NA_c^2 \Delta d \quad (3)$$

When $NA_c$ is equal to 0.33, n is 1.58 and $\Delta d$ equal to 0.6 mm, the defocusing, i.e. the preferred position is 6 µm away from the paraxial focus. This corresponds to a defocusing of about four focal depths of the converging beam. A reasonable scanning quality can still be obtained when the position is chosen within a range from the preferred position minus half a focal depth of the radiation beam passing through the central area to the preferred position plus half the focal depth. The focal depth is equal to $\lambda/(2NA_c^2)$, which is equal to 3 µm for the given parameter values, leading to a range from 4.5 to 7.5 µm away from the paraxial focus.

Figure 5D:
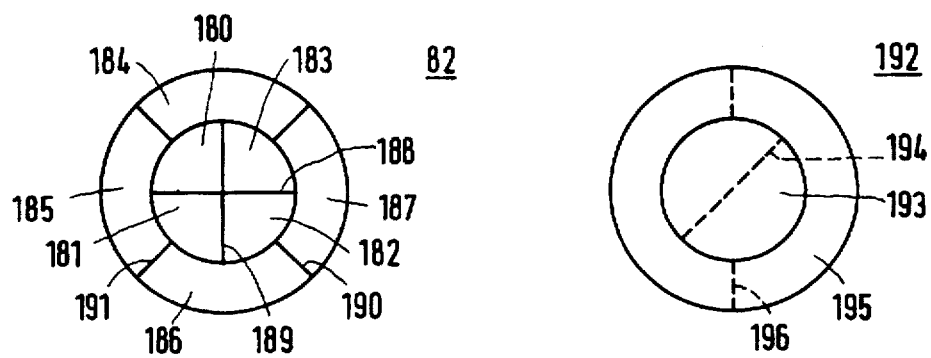
FIG. 5B, 5C and 5D show embodiments of a detector of the device in FIG. 5A for the astigmatic method.
Figure 5A:
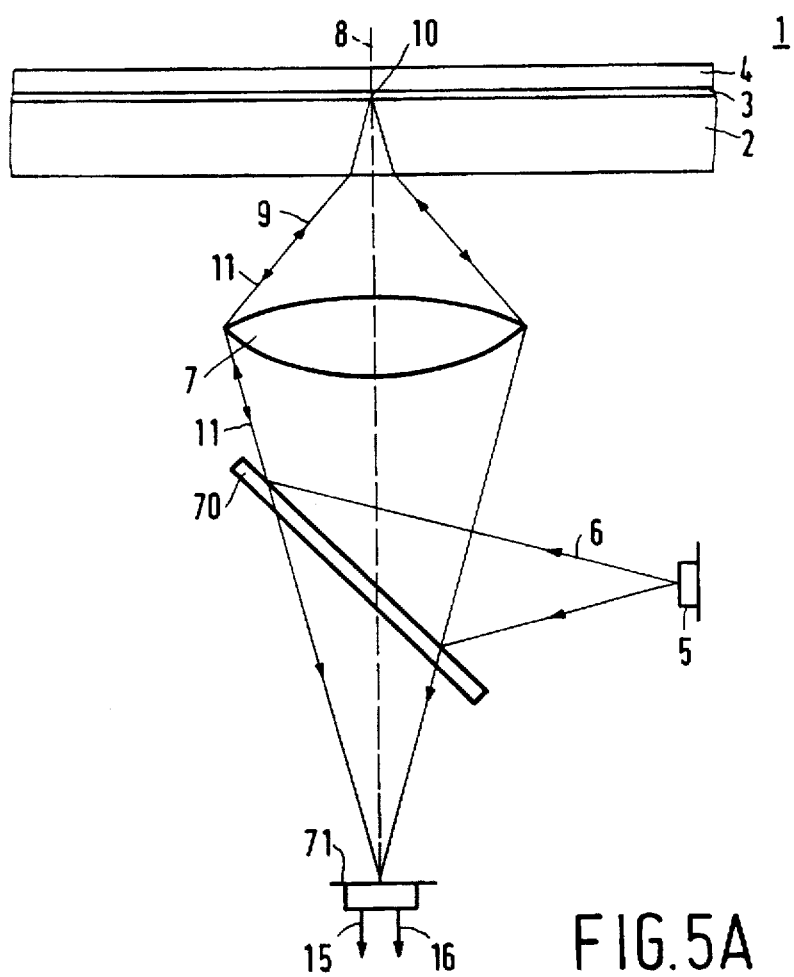
FIG. 5A shows a device according to the invention scanning a record carrier of the first type.
Figure 5B:
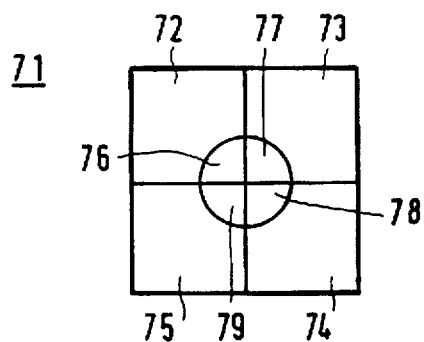

FIG. 5A shows a scanning device according to the invention in which measures of the second class have been taken, using a near-field selection of rays in the central and outer part of the reflected beam. The measures ensure that the best focus of the converging beam 9 is positioned on the information layer 3 of a record carrier of the first type and the paraxial focus is positioned on the information layer 23 of a record carrier of the second type. The radiation beam 6 from the laser 5 is reflected by a beam splitter 70 towards the objective lens 7. The reflected beam i 1 is partly transmitted by the beam splitter 70 towards detection system 71. A substrate of the beam splitter, obliquely arranged in the converging reflected beam, imparts astigmatism to the reflected beam, which aberration is used for generating the focus error signals. The detection system 71 as shown in FIG. 5B comprises two quadrant detectors, one forming the central part of the other. The outer quadrant detector comprises sub-detectors 72 to 75, the inner quadrant detector comprises sub-detectors 76 to 79. The inner quadrant detector intercepts radiation mainly from the central part of the reflected beam 11. A first focus error detection system for determining the best focus error forms the sum signal of the output signals of the two sub-detectors in each quadrant, the four sum signals then being combined to form a focus error signal according to the known astigmatic method. A second focus error detection system for determining the paraxial focus error signal combines the output signals of only the sub-detectors in the inner quadrant to form a focus error signal according to the astigmatic method. A selector as shown in FIG. 2B may be used to select which one of the two focus error signals is routed to the servo controller 17.

The inner quadrant detector 76 - 79 in FIG. 5B has a circular outer edge. The performance of the quadrant detector may be improved by making the outer edge rectangular, as shown by line 81 of the detection system 80 shown in FIG. 5C. In that case the shape of the inner quadrant detector is adapted to the slightly rectangular cross-section of the circle of least confusion of the astigmatic reflected beam 11 incident on the detector. Moreover, the radiation-sensitive area has then a minimum size such that the length of the focal lines is about equal to the length of the diagonals of the rectangle. Detection systems 71 and 80 may also be used in a device as shown in FIG. 1A, in which the beam splitter 12 does not split the reflected beam in two separate detection beams and is provided with a grating imparting astigmatism to the diffracted detection beam 13.

FIG. 5D shows an embodiment of the focus error detector according to the astigmatic method for use in the device shown in FIG. 5A and which has the advantage that, when scanning a record carrier of the second type, the influence of the marginal rays on the detection of the paraxial focus error has been reduced substantially. The detection system comprises an inner quadrant detector having sub-detectors 180 to 183 and an outer quadrant detector having sub-detectors 184 to 187. Dividing lines 188 and 189 of the inner quadrant detector are rotated over 45° with respect to dividing lines 189 and 190 of the outer quadrant detector. For this type of detector the astigmatism in the reflected beam 11 is preferably introduced by a composite astigmatic element 192 as shown in FIG. 5D instead of by the beam splitter 70. The element may be a composite cylinder lens or a composite grating. The element has a central area 193 which has substantially the size of the central area of the reflected beam at the location of the astigmatic element. The main direction 194 of the central area, i.e. the direction of the cylinder axis in case of a cylindrical element, makes an angle of 45° with the direction of the dividing lines 188, 189 of the inner quadrant detector to allow generation of a focus error signal according to the astigmatic method. The astigmatic element also has an annular area 195 with a main direction 196 making an angle of 45° with the main direction 194 in the central area.

When scanning a record carrier of the first type, the focus error signal of the detection system 82 can be formed by adding signals from corresponding sub-detectors of the inner and outer quadrant detector and combining these four signals in the usual way to a focus error signal, thereby using radiation of the entire cross-section of the reflected beam 11. When scanning a record carrier of the second type, the focus error signal may be derived from the signals of the four inner sub-detectors 180 to 183. The astigmatic element 192 may cause radiation from the annular area of the reflected beam 11 to fall on the inner quadrant detector. However, due to the 45° rotation of the dividing lines, this radiation now falls symmetrically on the sub-detectors of the inner quadrant detector and do not disturb the paraxial focus error signal. The signals from two diagonally positioned sub-detectors of the outer quadrant detector on both sides of the effective track direction in which the record carrier is being scanned may be used to generate a radial tracking error signal according to the push-pull method. When the track pitch of the record carrier is relatively small, only areas near the outer edge of the cross-section of the reflected beam 11 will contribute to the radial tracking error signal. Radiation in areas of the cross-section that do not contribute to the error signal fall on sub-detectors which are not used for generating the error signal, and do not affect the radial tracking error signal.

Figure 5C:
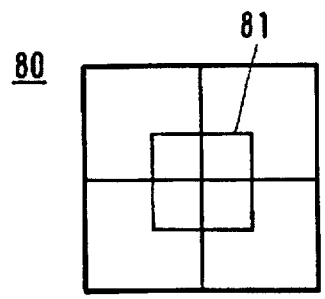

The size of the inner quadrant detector in FIGS. 5B, 5C and 5D is preferably between one and two times the diameter of the circle of least confusion of the astigmatic beam incident on the quadrant detector and originating from the central area of the reflected beam 11. The astigmatic focus lines, having a length of twice the diameter of the circle of least confusion, will then still fit on the inner quadrant detector. The diameter of the circle of least confusion is equal to $\Delta F \, NA_c/M$, with $\Delta F$ the astigmatic distance, $NA_c$ the numerical aperture of the central area of the reflected beam as seen near the focus 10 and M the magnification between the information layer and the detection system. The value of $NA_c$ is derived from formula (1) in dependence on the types of record carrier to be scanned. The value of $\Delta F$ determines the capture range of the focus error detection system and should be chosen relatively large for the embodiments of the device shown in FIG. 5. The diameter of the circle of least confusion and the length of the astigmatic focus lines when scanning a record of the first type are about twice as large as the above values, because the effective numerical aperture of the reflected beam is about twice as large. Then the inner and outer quadrant detectors must be used to determine the focus error.

An improvement of the spatial filtering in the device shown in FIG. 5A can be achieved by arranging an elliptical diaphragm in the reflected beam 11 between the astigmatism-introducing element and the detection system 71. The long axis of the diaphragm is parallel to the astigmatic line of the reflected beam located between the diaphragm and the detection system. The length of the long axis is preferably equal or larger than the diameter of the entire cross-section of the reflected beam in the plane of the diaphragm. The length of the short axis is between the diameter of the central area of the reflected beam and the diameter of the entire cross-section.

Figure 6A:
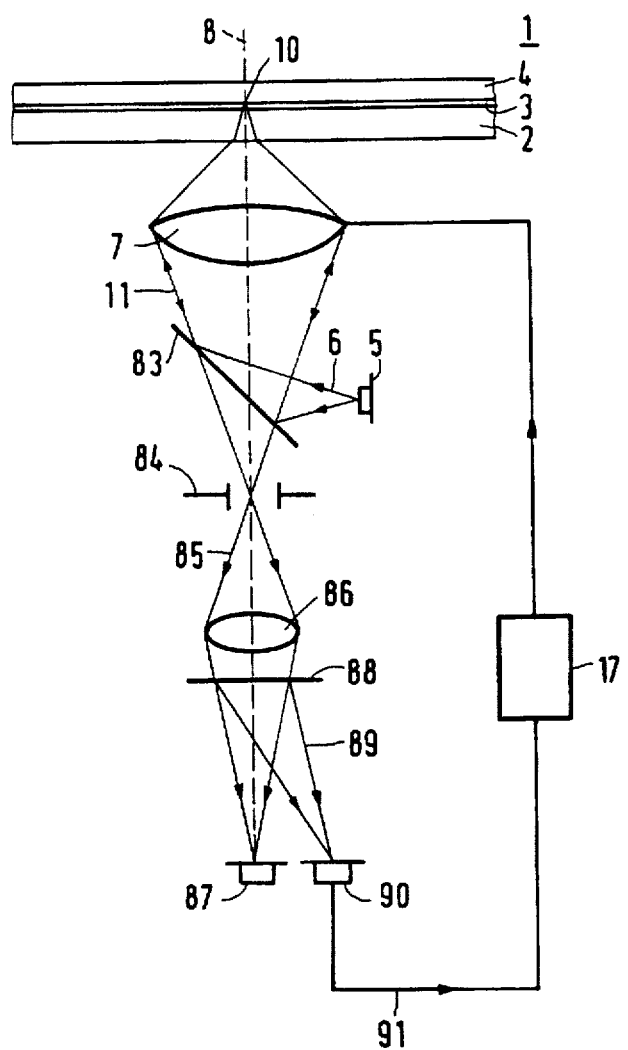
FIG. 6A and 6B show two embodiments of the device according to the invention scanning a record carrier of the first type.

FIG. 6A shows a scanning device in which measures of the third class have been taken to ensure that the best focus of the converging beam 9 is positioned on the information layer 3 of a record carrier of the first type and the paraxial focus is positioned on the information layer 23 of a record carrier of the second type. The measures include removal of strongly aberrated rays in the near field. The radiation beam 6 from the laser 5 is reflected by a beam splitter 83 towards the objective lens 7, which forms the focal spot 10 on the information layer. The beam 11 reflected from the information layer 3 is partly transmitted by the beam splitter 83 and forms and image of the focal spot 10 in the aperture of a diaphragm 84. The spatially filtered beam 85 after the aperture is converged by a lens 86 on an information detector 87. A beam splitter 88 splits off part of the filtered beam 85 in the form of a detection beam 89, which is incident on a focus error detection system. The beam splitter 88 may be a grating which imparts the required properties such as astigmatism, division in sub-beams or defocusing to the detection beam 89 for detection of the focus error according to the astigmatic, Foucault or beam-size method, as described above with reference to the FIGS. 2, 3 and 4.

When a record carrier of the first type is being scanned, the image of the focal spot 10 at the position of the diaphragm 84 is sharp and has a small lateral cross-section. The size of the aperture of the diaphragm is larger than the size of the lateral cross-section, so that the reflected beam passes the diaphragm substantially untruncated. The detection system 90 receives radiation of substantially the entire cross-section from the reflected beam 11, and the output signal 91 of the system, connected to the focus servo controller 17, will be the best focus error, as required for scanning a record carrier of the first type.

When a record carrier of the second type is being scanned, the image at the position of the diaphragm 84 is blurred because of the spherical aberration caused by the uncompensated thickness of the transparent layer of the record carrier. The aperture of the diaphragm passes only the central rays of the reflected beam, intercepting the strongly aberrated rays from the annular outer area of the reflected beam causing the blur of the image. The detection system 90 now receives only rays from a central area of the reflected beam, and the output signal 91 of the system will be the paraxial focus error signal. The controller 17 now positions the paraxial focus on the information layer 23 of the record carrier of the second type. An advantage of a device of the third class is that it does not require a selector for selecting between the two focus error signals, because the selection is made automatically by the fixed diaphragm. Another advantage is that only one focus error detection system is needed.

The diameter $\Phi$ of the diaphragm aperture is preferably taken to be substantially equal to $$\Phi = 10 \, W_{40} \frac{\lambda}{NA_c} M, \tag{4}$$

with a minimum value of $3\lambda M/NA_0$ for small spherical aberration in order to allow the generation of low-jitter information signals also in this case. $NA_c$ is the numerical aperture of the central area of the reflected beam incident on the objective lens 7, $NA_0$ that of the entire reflected beam, $W_{40}$ the spherical aberration at the edge of the central area and M the magnification between the information layer 23 and the diaphragm 84. The values of $NA_c$ and $W_{40}$ are derived from formula (1). When using the parameters of the embodiment described below formula (1) and M=5, the value of 1, is 51 μm. The value of $\Phi$ is not very sensitive to the value of the parameters, and a value of $\Phi=\beta\lambda/NA_0$ with $\beta=10$ may be used for many combinations of first and second types of record carrier. The tolerance range for $\beta$ is from 5 to 20. Values of $\beta$ in the range from 8 to 13 have, apart from the advantage of low-jitter information signals, the additional advantage of large axial position tolerance of the diaphragm.

When the size of the detection system 71 in the device shown in FIG. 5A is made substantially equal to the above value of $\Phi$, the device will operate as the device shown in FIG. 6A. The detection system will intercept radiation from over the entire cross-section of the reflected beam 11 when scanning a record carrier of the first type and it will intercept radiation mainly from the central area of the reflected beam when scanning a record carrier of the second type. The detection system 71 may then comprise a single quadrant detector, the size of which is about equal to the value of $\Phi$. The amount of astigmatism $\Delta F$ imparted to the reflected beam must be so small that the length of the astigmatic focus lines pertaining to the entire cross-section of the reflected beam is substantially smaller than $\Phi$. Or, in a formula:

$$\frac{2\Delta FNA_0}{M} \leq \Phi \tag{5}$$

The four output signals of the quadrant detector may be combined to yield the focus error signal, the push-pull radial error signal and the information signal. These three signals are equally appropriate for scanning a record carrier of both the first and the second type, without making any changes in the way of forming the signals when changing between types of record carriers. From the above examples it will be clear that the device according to the invention is tolerant for the value of $NA_c$ and, hence, for the value of the thickness difference $\Delta d$. In contrast to this, the device known from EP 0 610 055 is designed for a specific value of $\Delta d$, and is not very tolerant for thickness differences.

Figure 6B:
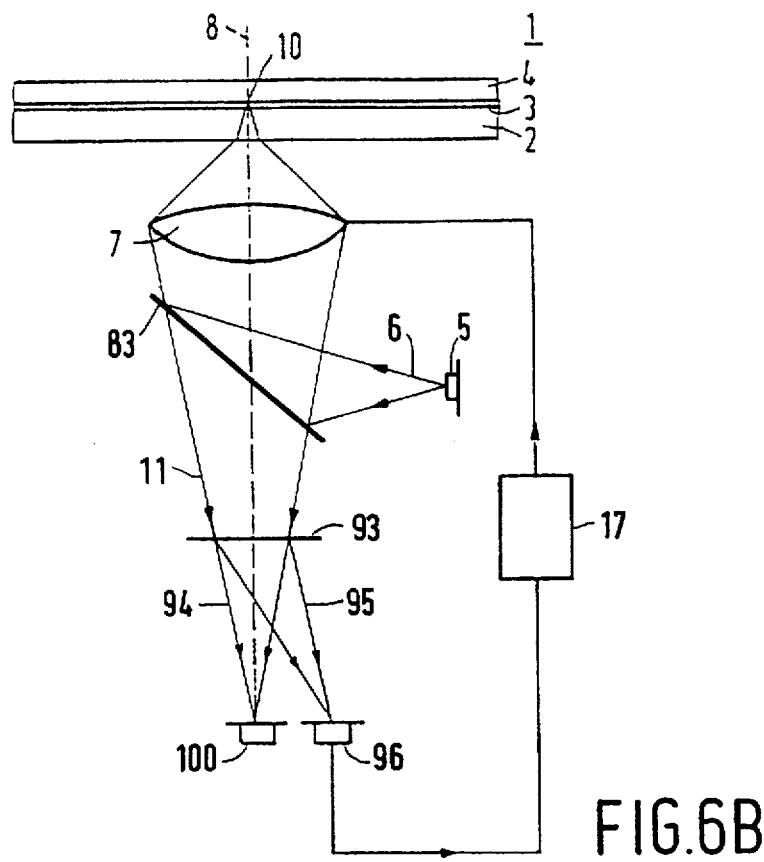
Figure 6C:
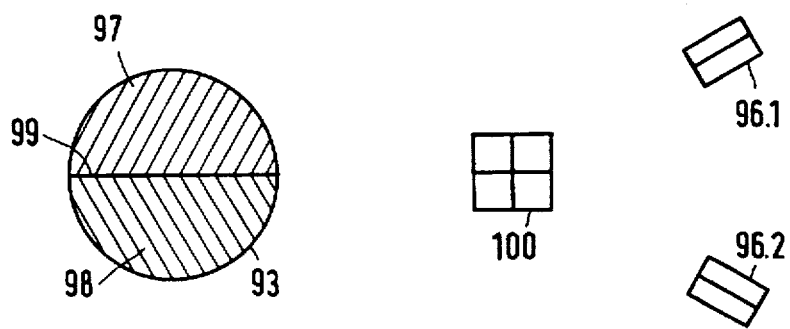
FIG. 6C shows the layout of the grating plate and the detectors of the embodiment shown in FIG. 6B.

FIG. 6B shows an embodiment of a scanning device in which the above mentioned small-sized detectors are used. The reflected beam 11 is split by a grating plate 93 into a zero-order beam 94 and at least one higher-order beam 95, preferably a first-order beam. The higher-order beam is intercepted by a focus error detection system 96, which generates the focus error by the Foucault or beam-size method. The size of the radiation-sensitive surface of detection system is substantially equal to the value of $\Phi$ as given in equation (4). FIG. 6C shows a top view of an embodiment of the grating plate 93 for the Foucault method, comprising two gratings 97, 98, one at each side of a dividing line 99. The gratings 97 and 98 each cover about half of the cross-section of the reflected beam 11 and each direct a beam towards split detectors 96.2 and 96.1 respectively. Output signals of the two split detectors are used to form the focus error signal according to the double-Foucault method. The overall width of each split-detector in a direction perpendicular to their dividing lines is substantially equal to the value of $\Phi$ of equation (4).

The zero-order beam 94 is incident on a quadrant detector 100. The sum of the output signals of the four quadrants can be used to form an information signal. The four output signals can also be used to form a radial tracking error signal according to the so-called diagonal phase detection or diagonal time detection method, in which phases or timedelays between the high-frequency components of the output signals are determined. This generation of the radial tracking error signal requires that the quadrant detector 100 be placed in the far field of the first-order beam 94. To that end, the quadrant detector can be moved a small distance away from the focal point of beam 94. In case the substrate thickness of the first type of record carrier is smaller than that of the second type of record carrier, the quadrant detector 100 is preferably moved towards the grating plate 93. The displacement is preferably larger than six focal depths of beam 94 in order to be in the far field of beam 94 to allow generation of the radial tracking error. On the other hand, the displacement should be smaller than ten focal depths to still have sufficient spatial filtering by the small detector 100. The optimum position of the detection system 100 is eight focal depths away from the focal point of the beam 94 towards the grating plate 93.

Instead of displacing the detection system 100, it is also possible to change the position of the focal point of the higher-order beam 95 by giving the grating plate some optical strength and arranging a substrate carrying the detectors 96 and 100 such that the focal point of beam 95 is again correctly located with respect to the detector 96. A proper choice of the shift of the focal point of beam 95 will then cause the detector 100 to be located the required substantially eight focal depths away from the focal point of beam 94. The detectors 96 and 100 can then remain in the same plane, thereby simplifying the construction of the device.

The at least six focal depths out-of-focus position of the detector 100 can be used in any optical scanning device in which a single detector is used to generate both an information signal and a radial tracking error signal from the high-frequency components of the detector signals, independent of provisions in the device for scanning through substrates of different thicknesses such as the use of small detectors.

Figure 7A:
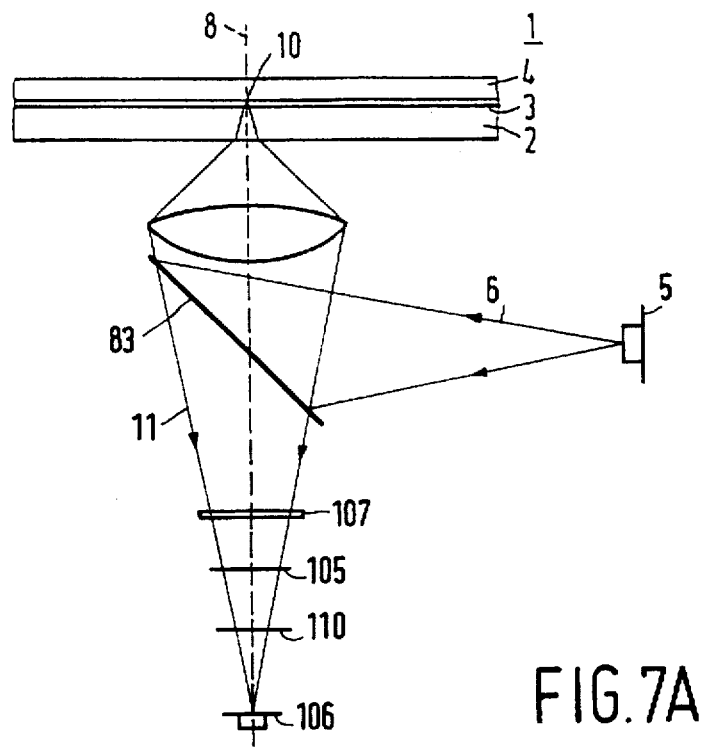
FIG. 7A shows an embodiment of the device according to the invention.
Figure 7B:
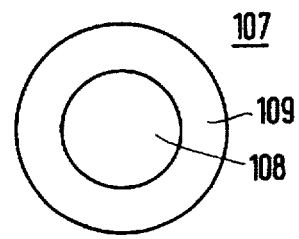
FIG. 7B shows a top-view of a ring half-wave plate.

FIG. 7A shows a device according to the invention in which measures of the fourth class have been taken to prevent aberrated rays from affecting the generation of the focus error signal. The measures include removal of aberrated rays in the far field. The beam 11 reflected from the record carrier 1 is passed through an astigmatic element 105, imparting astigmatism to the reflected beam, and converges on a quadrant detector 106. Output signals of the detector 106 are used to generate a focus error signal according to the astigmatic method. A ring half-wave plate 107 has been arranged between the beam splitter 83 and the astigmatic element 105, i.e. in the far field of the reflected beam 11. FIG. 7B shows a top-view of the ring half-wave plate 107. The plate comprises a central area 108 and an annular area 109 around it. The size of the central region corresponds to the numerical aperture $NA_c$, the outer diameter of the annular area 109 is at least as large as the outer diameter of the annular outer area of the reflected beam. The plate rotates the direction of polarization of radiation passing through the central area of the element over 90° with respect to radiation passing through the annular area. A polarizer 110 has been removably arranged between the astigmatic element 105 and the detector 106. The orientation of the polarizer is such that it transmits radiation passed through the central area 108 of the ring half-wave plate. When the device scans a record carrier of the second type, the polarizer 110 is arranged in the reflected beam, where it will intercept radiation from the annular outer area of the reflected beam. The focus error generated by the detector from only radiation in the central area of the reflected beam is then the paraxial focus error. When the device scans a record carrier of the first type, the polarizer 110 is removed from the reflected beam 11, and all radiation of the reflected beam falls on the detector 106. The focus error then corresponds to the best focus. The ring half-wave plate 107 and the polarizer 110 together form adjustable blocking means. The position of the polarizer in the reflected beam is not very critical. Consequently, the means for moving the polarizer in and out of the beam need not have tight tolerances, and can be made relatively cheap.

Figure 7C:
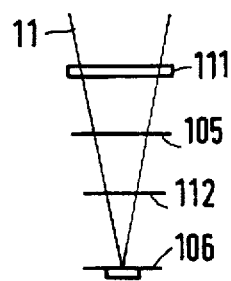
FIG. 7C shows part of an embodiment of the device according to the invention.

FIG. 7C shows part of an alternative embodiment of the device according to the invention in which the adjustable blocking means comprise a liquid crystal element 111, having a central area for receiving radiation in the central area of the cross-section of the reflected beam and an annular area surrounding the central area, comparable to the ring half-wave plate 107 shown in FIG. 7B. The element can be controlled electrically to rotate the direction of polarization of radiation passed through the annular area with respect to the direction of polarization of radiation passed through the central area of the liquid crystal element over an angle of 0° when scanning a record carrier of the first type and over 90° when scanning a record carrier of the second type. The blocking means also comprise a polarizer 112 arranged between the astigmatic element 105 and the focus error detector 106, the polarizer being orientated to transmit radiation from the central area of the element to the focus error detection system. When a record carrier of the first type is scanned, the liquid crystal element 111 is controlled to rotate the polarization of radiation of the reflected beam 11 passing through the annular area such that it passes through the polarizer. The detector 106 receives radiation from the entire cross-section of the reflected beam and therefore generates the focus error for the best focus. When a record carrier of the second type is scanned, the liquid crystal element 111 is controlled to rotate the polarization of radiation of the reflected beam 11 passing through the annular area such that it is absorbed in the polarizer. The detector 106 receives radiation from only the central area of the reflected beam and therefore generates the focus error for the paraxial focus. This blocking means has the advantage that it requires a one-time adjustment of the position of the components in the path of the reflected beam and no further mechanical motion for the switching the blocking of the outer part of the reflected beam on and off.

The information signal representing the information read from the information layer may be obtained from the detectors of the focus error detection system or from a separate information detector. The information signal may be formed by summing the output signals of the eight quadrants of the two quadrant detection systems 30 and 31 in FIG. 2A. When reading a record carrier of the second type, the information signal derived from the eight quadrants will show an increased jitter because of the spherical aberration. An information signal with reduced jitter may be obtained by using only the four quadrants of the detection system 30, thereby using radiation from the central part of the reflected beam 11 only. In the detector configuration of FIG. 3 the information signal may be derived by summing the output signals of the eight sub-detectors of the split detectors 46 to 49 for a record carrier of the first type and of the split detectors 46 and 47 for a record carrier of the second type. In the detector configuration of FIG. 4 the information signal may be derived by summing the output signals of the eight sub-detectors of the detectors 57, 58, 65 and 66 for a record carrier of the first type and of the detectors 57 and 58 for a record carrier of the second type. In the device shown in FIG. 6A the information signal may be derived from the focus error detection system 90 or from a separate information detector 87. In both cases the selection between use of radiation in the entire cross-section of the reflected beam or in the central part of the reflected beam only is made automatically by the diaphragm 84. When the information signal is generated in a separate information detector, the radiation-sensitive surface of this detector has preferably the size of the aperture of the diaphragm 84. Such a detector will provide a low jitter information signal for record carders of both the first and second type and may be used in devices as shown in FIGS. 1A and 5A without an intermediate image in the aperture of a diaphragm such as in the device of FIG. 6A.

We claim:

1. Optical scanning device for scanning a first type of record carrier having a first information layer and a first transparent layer of a first thickness and for scanning a second type of record carrier having a second information layer and a second transparent layer of a second thickness different from the first thickness, comprising a radiation source for generating a radiation beam and an objective lens designed for converging the radiation beam to a focus, said focus comprising a best focus and a paraxial focus, characterized in that the device comprises means for positioning the best focus of the radiation beam substantially on the first information layer and the paraxial focus of said radiation beam substantially on the second information layer.

2. Optical scanning device according to claim 1, characterized in that the means for positioning are operatively arranged to form a best focus error signal out of radiation in at least an annular outer area of the cross-section of a beam of radiation reflected from the scanned record carrier and a paraxial focus error signal out of radiation in a central area within the annular outer area of said cross-section, and in that the means for positioning comprise a focus servo system for positioning the objective lens in response to the best focus error signal when scanning a record carrier of the first type and to the paraxial focus error signal when scanning a record carrier of the second type.

3. Optical scanning device according to claim 2, characterized in that the means for positioning comprise a type detector for generating a type signal indicating the type of record carrier being scanned, and a selector for selecting in response to the type signal the focus error signal for control of the focus servo system.

4. Optical scanning device according to claim 2, characterized in that the means for positioning comprise a first focus error detection system for forming the best focus error signal and a second focus error detection system for forming the paraxial focus error signal.

5. Optical scanning device according to claim 4, characterized in that the first and second focus error detection systems comprise a first and second radiation-sensitive detection system respectively, the second radiation-sensitive detector forming a ring around the first radiation-sensitive detector.

6. Optical scanning device according to claim 5, in which the first radiation-sensitive detector comprises four sub-detectors arranged as quadrants between a first pair of orthogonal dividing lines, and the second radiation-sensitive detector comprises four sub-detectors arranged as quadrants between a second pair of orthogonal dividing lines, the lines of the first and second pair having mutual angles of 45°, the device also comprising a composite astigmatic element arranged in the path of the reflected beam and having a central area with a first astigmatic power and an annular area surrounding the central area having a second astigmatic power, the main direction of the central area forming an angle of 45° with the main direction of the annular area.

7. Optical scanning device according to claim 2, comprising a beam-dividing element for dividing the radiation beam reflected from the record carrier into a first and second detection beam, a first radiation-sensitive detection system being arranged in the path of the first detection beam and a second radiation-sensitive detector being arranged in the path of the second detection beam, in which the second detection beam comprises radiation mainly from the central area and the first detection beam comprises radiation from at least the annular outer area.

8. Optical scanning device according to claim 7, in which the beam-dividing element has the additional function of coupling the reflected beam out of the path of the radiation beam from the radiation source.

9. Optical scanning device according to claim 2, characterized in that the means for positioning comprise a focus error detection system having a radiation-sensitive detector for forming a focus error signal out of radiation in a reflected beam of radiation coming from the scanned record carrier, the radiation-sensitive surface of the detector having an effective size such that it captures radiation from substantially the entire cross-section of the reflected beam when scanning a record carrier of the first type for forming a best focus error signal, and radiation mainly from the central area of said cross-section when scanning a record carrier of the second type for forming a paraxial focus error signal.

10. Optical scanning device according to claim 9, characterized in that it comprises a beam-dividing element arranged in the reflected beam for forming a zeroth order beam and a diffracted higher-order beam, and a detection system arranged in the path of the zeroth-order beam for generating an information signal representing information stored in the information layer, and in that the radiation-sensitive detector for forming the focus error signal is arranged in the path of the diffracted higher-order beam.

11. Optical scanning device according to claim 2, characterized in that the means for positioning comprise adjustable blocking means arranged in the path of the reflected beam for blocking radiation in an annular outer area of the cross-section of the reflected beam when scanning a record carrier of the second type, and a focus error detection system having a radiation-sensitive detector for forming a focus error signal out of radiation in a reflected beam of radiation coming from the scanned record carrier, which focus error signal is the best focus error signal when scanning a record carrier of the first type and the paraxial focus error signal when scanning a record carrier of the second type.

12. Optical scanning device according to claim 11, characterized in that the adjustable blocking means comprise a liquid crystal element having a central area for receiving radiation in the central area of the cross-section of the reflected beam and an annular area surrounding the central area, the element being operatively connected to rotate the direction of polarization of radiation passed through the annular area with respect to the direction of polarization of radiation passed through the central area of the liquid crystal element over an angle of 0° when scanning a record carrier of the first type and over 90° when scanning a record carrier of the second type, the blocking means also comprising a polarizer arranged between the liquid crystal element and the focus error detection system, the polarizer being orientated to transmit radiation from the central area of the element to the focus error detection system.

13. Optical scanning device according to claim 11, characterized in that the adjustable blocking means comprise a half-wave element having a central area for receiving radiation in the central area of the cross-section of the reflected beam and an annular area surrounding the central area for rotating the direction of polarization of radiation passed through the central area of the element over 90° with respect to radiation passed through the annular area, the device also comprising a polarizer removably arranged between the half-wave element and the radiation-sensitive detector for transmitting radiation passed through the central area of the element.

14. Optical scanning device according to claim 1, comprising a first and a second radiation-sensitive information detector for generating an electric information signal from a beam of radiation reflected from the record carrier, in which the first information detector intercepts radiation from substantially the entire cross-section of the reflected beam and the second information detector intercepts radiation mainly from the central area of said cross-section.

15. Optical scanning device according to claim 14, characterized in that the second information detector forms a central part of the first information detector.

16. Optical scanning device according to claim 1, comprising a radiation-sensitive information detector for generating an information signal out of a beam of radiation reflected from the scanned record carrier, the radiation-sensitive surface of the information detector having an effective size such that it captures radiation from substantially the entire cross-section of a beam of radiation reflected from the scanned record carrier when scanning a record carrier of the first type, and radiation mainly from the central area of the cross-section when scanning a record carrier of the second type.

17. Optical scanning device according to claim 1, in which the first thickness is smaller than the second thickness.

18. Optical scanning device according to claim 17, in which the first information layer has a higher information density than the second information layer.

19. Method for optically scanning a first type of record carrier having a first information layer and a first transparent layer of a first thickness and a second type of record carrier having a second information layer and a second transparent layer of a second thickness different from the first thickness, comprising the step of converging a radiation beam by means of an objective lens through the first transparent layer to a best focus substantially on the first information layer when scanning a record carrier of the first type, and the step of converging the radiation beam by means of the objective lens through the second transparent layer to a paraxial focus substantially on the second information layer when scanning a record carrier of the second type.

20. Method according to claim 19, comprising the step of forming a best focus error signal from radiation in at least an annular outer area of the cross-section of a beam of radiation reflected from the record carrier when scanning a first type of record carrier, and the step of forming a paraxial focus error from radiation mainly in a central area within the annular outer area when scanning a second type of record carrier, and the step of controlling the position of the objective lens in response to the best focus error signal when scanning a record earlier of the first type and in response to the paraxial focus error when scanning a record carrier of the second type.

21. Method according to claim 19, comprising the step of generating an information signal from radiation in substantially the entire cross-section of a beam of radiation reflected from the record cartier when scanning a record carrier of the first type, and the step of generating an information signal from radiation in a central area of said cross-section when scanning a record carrier of the second type.

* * * * *